United States Patent
Das (10) Patent No.: US 10,237,436 B1
(45) Date of Patent: Mar. 19, 2019

(54) EXTRACTION OF SPECIFIC COLOR PLANE TO SUPPORT MULTIPLE SPOT LAYER RANGE FOR N-UP COPYING OR PRINTING

(71) Applicant: Xerox Corporation, Norwalk, CT (US)

(72) Inventor: Arindam Das, West Bengal (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/815,861

(22) Filed: Nov. 17, 2017

(51) Int. Cl.
| | |
|---|---|
| *G06F 3/12* | (2006.01) |
| *H04N 1/00* | (2006.01) |
| *H04N 1/23* | (2006.01) |
| *H04N 1/50* | (2006.01) |
| *H04N 1/60* | (2006.01) |
| *G03G 15/00* | (2006.01) |
| *G03G 15/01* | (2006.01) |
| *G06K 15/02* | (2006.01) |
| *H04N 1/191* | (2006.01) |
| *H04N 1/203* | (2006.01) |
| *H04N 1/387* | (2006.01) |

(52) U.S. Cl.
CPC ....... *H04N 1/0096* (2013.01); *G03G 15/0184* (2013.01); *G03G 15/6585* (2013.01); *G06F 3/125* (2013.01); *G06F 3/1208* (2013.01); *G06F 3/1219* (2013.01); *G06F 3/1229* (2013.01); *G06K 15/1848* (2013.01); *G06K 15/1868* (2013.01); *G06K 15/1869* (2013.01); *G06K 15/1878* (2013.01); *H04N 1/00204* (2013.01); *H04N 1/1911* (2013.01); *H04N 1/203* (2013.01); *H04N 1/2323* (2013.01); *H04N 1/387* (2013.01); *H04N 1/502* (2013.01); *H04N 1/6008* (2013.01); *G03G 15/50* (2013.01); *G03G 2215/0129* (2013.01); *G03G 2215/0177* (2013.01)

(58) Field of Classification Search
None
See application file for complete search history.

(56) References Cited

U.S. PATENT DOCUMENTS

| | | | |
|---|---|---|---|
| 7,295,341 B2 | 11/2007 | Nagarajan et al. | |
| 7,756,454 B2 | 7/2010 | Crean et al. | |
| 8,315,532 B2 | 11/2012 | Brown | |
| 8,736,902 B2 | 5/2014 | Robinson et al. | |
| 9,025,987 B2 * | 5/2015 | Shindo | G06F 3/1208 399/79 |
| 9,423,748 B1 | 8/2016 | Robinson et al. | |
| 2018/0332195 A1 * | 11/2018 | Das | H04N 1/6097 |

* cited by examiner

*Primary Examiner* — Scott A Rogers
(74) *Attorney, Agent, or Firm* — Gibb & Riley, LLC (57) ABSTRACT

Print jobs call for printing multiple logical pages on the same sheet, using base colorants and an extension colorant, and call for a different number of printing passes of the extension colorant for different logical pages. A first bitmap is created, and a first printing pass prints the first bitmap. The first bitmap is then modified to leave only the extension colorant plane, to create a modified bitmap; and a second printing pass prints the modified bitmap on the same sheet. The modified bitmap is additionally modified by removing printing pixels for the logical pages that do not contain an instruction to perform an additional printing pass of the extension colorant; and an additional printing pass prints the modified bitmap. These printing passes are repeated until no more of the logical pages contain the instruction to perform an additional printing pass of the extension colorant.

20 Claims, 7 Drawing Sheets

EXTRACTION OF SPECIFIC COLOR PLANE TO SUPPORT MULTIPLE SPOT LAYER RANGE FOR N-UP COPYING OR PRINTING

BACKGROUND

Systems and methods herein generally relate to printing systems that print multiple logical pages on each physical sheet of print media (e.g., N-Up, booklet, signature, etc.), and more particularly to such printing that performs multiple printing passes.

In the printing domain, some features (e.g., N-Up, booklet, signature, etc.) allow multiple logical pages to be imposed on the same physical surface. For example, N-up printing prints multiple logical pages on each sheet of print media. For purposes herein "logical pages" are separate individual pages of a print job, each of which could be printed on a separate sheet of print media. However, by performing N-up printing, less marking material (ink, toner, etc.) and less print media (paper, transparencies, card stock, etc.) is used, which saves such resources and is more environmentally friendly.

In addition, printing or rendering a surface using a single spot color, such as CMYK+X (where X could be any specialty color, such as white, clear, gold, silver, orange, etc.) within a single layer range, is a popular feature in heavy production printing houses. More specifically, in order to print using colors other than the printer's permanent colors (e.g., red, green, blue (RGB) in a RGB printer; cyan, yellow, magenta, black (CMYK) in a CMYK printer; etc.) that are used for all print jobs, or the vast majority of print jobs, some printers include an additional housing (sometimes referred to as the fifth color housing, or Xth housing if more than 5 are enabled). The fifth color housing holds replaceable printing modules (sometimes referred to as a customer replaceable unit (CCU), fifth color module, spot color module, or imaging media cartridges) that print using more expensive and less frequently used marking materials (e.g., clear ink/toner, white ink/toner, gold ink/toner, silver ink/toner, orange ink/toner, etc.) and are separate from the permanent color printing modules. The fifth color housing allows switching of the replaceable printing modules seamlessly in minutes.

SUMMARY

Various methods herein receive and process print jobs. Such print jobs can include instructions to print multiple logical pages of the print job on a given sheet (e.g., print multiple logical pages of the print job, potentially on a single sheet of print media). In such processing, the printing can simultaneously print different logical pages of the print job on different regions of a given sheet of print media (e.g., N-up printing, booklet, signature, etc.) to avoid overlap of the logical pages on the sheet. In one example, the print job can include instructions to print at least two of the multiple logical pages on each side of each sheet of print media in duplex N-up printing.

Also, these print jobs can call for printing these multiple logical pages using base colorants and an extension colorant. The extension colorant comprises user-changeable color, and the base colorants comprise non-changeable colors that are permanent to the printer, and are used to print all print jobs. The extension colorant uses a more expensive marking material relative to the base colorants, and is therefore generally used sparingly.

Further, the printing of the extension colorant can be performed in multiple printing passes. In such situations, print jobs can be processed by methods herein to perform a different number of printing passes of the extension colorant, even for different logical pages that are printed on the same sheet.

More specifically, these methods create (using a processor of the printer) a first bitmap of the base colorants and the extension colorant for the multiple logical pages being simultaneously printed on a given sheet. Then, these methods use a marking engine of the printing device to perform a first printing pass by printing first markings of the base colorants and the extension colorant on a sheet according to the first bitmap.

Sheet feeding equipment of the printing device is used to return the single sheet to the marking engine after the first printing pass for additional markings to be printed on the markings printed in the first printing pass. For example, before multiple printing passes of just the extension marking material (discussed below) occur, intermediate markings of both the base colorants and the extension colorant can be printed on the same sheet to perform at least one intermediate printing pass after the first printing pass, and before the "second" printing pass discussed below. If there are any differences in the print pattern between print passes of such intermediate markings, new bitmaps are created by the raster image processor, which can be processing intensive.

Next, this processing initially modifies (using the processor) the first bitmap (without creating a new bitmap) by simply removing printing of potentially all the base colorant planes, leaving printing of only the extension colorant plane for ones of the logical pages that contain an instruction to perform an additional printing pass of the extension colorant, and this processing creates a modified bitmap. For example, the first bitmap comprises pixels in different color planes that determine printing, or non-printing, locations on the sheets for the marking devices. This processing can simply select just the extension colorant plane from the first bitmap, to create the modified bitmap, and such processing does not call on the raster image processor to create a new bitmap; thereby avoiding using raster image processor resources to produce the modified bitmap.

Such methods use the processor to create identifiers for the multiple logical pages that will be printed on a given sheet, and these methods associate one of these identifiers with each of the pixels in the first bitmap so that the raster image processor can know to which logical page each pixel in the first bitmap corresponds.

An additional (e.g., potentially second) printing pass is then performed by the marking engine, to print second markings of only the extension colorant on the same sheet, according to the modified bitmap. With methods herein, the processor additionally modifies the modified bitmap by removing printing of the extension colorant for ones of the multiple logical pages that do not contain an instruction to perform an additional printing pass of the extension colorant, and this creates a further modified bitmap. The additionally modified bitmap also does not require any processing resources of the raster image processor, and instead simply marks selected pixels as non-printing in the extension colorant plane.

Again, the sheet feeding equipment is used by methods herein to return the single sheet to the marking engine after the second printing pass. This allows an additional print pass to be performed by the marking engine, which prints additional markings of only the extension colorant on the same sheet according to the further modified bitmap. These processes of additionally modifying the bitmap, and performing additional printing passes are repeated for ones of the multiple logical pages that contain an instruction to perform an additional printing pass of the extension colorant, until no more of the multiple logical pages contain the instruction to perform an additional printing pass of the extension colorant. Finally, the sheet feeding equipment outputs the sheet after the repeated processing is completed.

Various printing devices herein perform such methods, and generally include (among other components) a processor, a marking engine electrically connected to the processor, sheet feeding equipment electrically connected to the processor, etc. The processor is capable of receiving a print job that calls for printing multiple logical pages on some, or every, sheet of print media (e.g., performed by simultaneously printing the multiple logical pages on different regions of the single sheet of print media). Again, such a print job can call for printing of the extension colorant in multiple printing passes, but where a different number of the printing passes of the extension colorant are used for different ones of the multiple logical pages.

The processor is capable of creating a first bitmap of the base colorants and the extension colorant for the multiple logical pages being simultaneously printed on the single sheet. The marking engine is capable of initially printing first markings of the base colorants and the extension colorant on the single sheet according to the first bitmap to perform a first printing pass.

The sheet feeding equipment is capable of returning the single sheet to the marking engine after the first printing pass. The marking engine is capable of printing intermediate markings of the base colorants and the extension colorant on the single sheet according to the first bitmap to perform at least one intermediate printing pass after the first printing pass, and before the second printing pass described below. Again, new bitmaps are created by the raster image processor in such processing, which can be processing intensive.

The processor is capable of initially modifying the first bitmap by removing printing of the base colorants and leaving printing of only the extension colorant for ones of the multiple logical pages that contain an instruction to perform an additional printing pass of the extension colorant, to create a modified bitmap. Again, the processor creates pixel identifiers for the multiple logical pages, and associates one of the identifiers with each of the pixels. The processor initially modifies the first bitmap by selecting only an extension colorant plane from the first bitmap to create the modified bitmap.

The marking engine is capable of secondarily printing second markings of only the extension colorant on the single sheet according to the modified bitmap to perform a second printing pass directly on the first printing pass. The processor is capable of additionally modifying the modified bitmap by removing printing of the extension colorant for ones of the multiple logical pages that do not contain an instruction to perform an additional printing pass of the extension colorant, to create a further modified bitmap.

The sheet feeding equipment is capable of returning the single sheet to the marking engine after the second printing pass. The marking engine is capable of additionally printing additional markings of potentially only the extension colorant on the single sheet according to the further modified bitmap to perform an additional printing pass.

The processor and the marking engine are capable of repeating this additional modifying and printing for ones of the multiple logical pages that contain an instruction to perform an additional printing pass of the extension colorant, until no more of the multiple logical pages contain the instruction to perform an additional printing pass of the extension colorant. The sheet feeding equipment is capable of outputting the single sheet after the repeating is completed.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, printing or rendering a surface can be performed using a spot color within a single layer range. As used herein, "layer range" indicates the number of printing passes that will be made for the given color, where a successive printing pass prints the same pattern (or part of the same pattern) most recently printed on a sheet of media, in the same location on the same sheet, and using the same color marking material.

Systems and methods herein allow printing of different logical pages on the same physical page, where the different logical pages will be printed in a different number of printing passes (of the same spot color). For example, with the systems and methods herein, for a single surface, a user may select that one logical page be printed as CMYK+X with a layer range of one (single pass printing), and another logical page as CMYK+X with a layer range of three (three pass printing). In order to address such issues, the methods and devices herein generate a modified raster buffer for each layer range.

More specifically, once each logical surface gets decomposed with the user specified spot color, the raster image processor (RIP) will place the consolidated raster for the given surface in a controller buffer manager (CBM). A marker performs a marking task, and sends the raster to a marking engine for printing. Once one raster is printed, then the stock is again brought back to the marking engine to print another layer of the same spot color. As the information about logical page specific layer range is already available to raster image process through a job chooser, the raster image processor will generate the consolidated (N-up) and fabricated raster planes for the spot color, as per the user's instruction of layer range.

The methodology used herein begins by identifying conflict layer ranges from the Job Chooser (JC) for a single surface. Next, the Job Description File (JDF) is populated with a proper page range, and the corresponding spot layer range. Such processing starts decomposing each logical page, as per the given instructions, and sending a first raster buffer, with a spot color, for one pass to marker. The marker performs the marking tasks and then sends the same to be printed. The marker then requests that another color plane be raster image processed (RIPped), if any other logical page requires more than one pass from same physical surface.

The raster image processor then extracts only the spot color plane from the consolidated buffer (CMYK+X) that is placed inside Controller Buffer Manager (CBM). The raster image processor clones this color plane to fabricate another bitmap, in order to meet the multi-pass printing requirements. Also, pixels belonging to logical pages that need at least one more pass for the layer range will be untouched, and the rest will be made negative pixels. Such processing identifies each logical page from the consolidated (N-up) buffer (and this can be achieved by introducing a unique identifier for each logical page). This identifier is associated with each pixel during the decomposition of the same surface, and this identifies to which logical surface a given pixel belongs. This fabricated color plane alone is then sent to the marker for print, and such processes are repeated for the additional layer range.

Therefore, systems and methods herein can be used with existing systems, to allow such systems to honor a multiple layer range of a spot color printed on single surface that includes multiple logical pages. This allows image quality to remain a central feature, which improves user satisfaction by allowing users to print logical cells using specified spot layer ranges.

Figure 1:
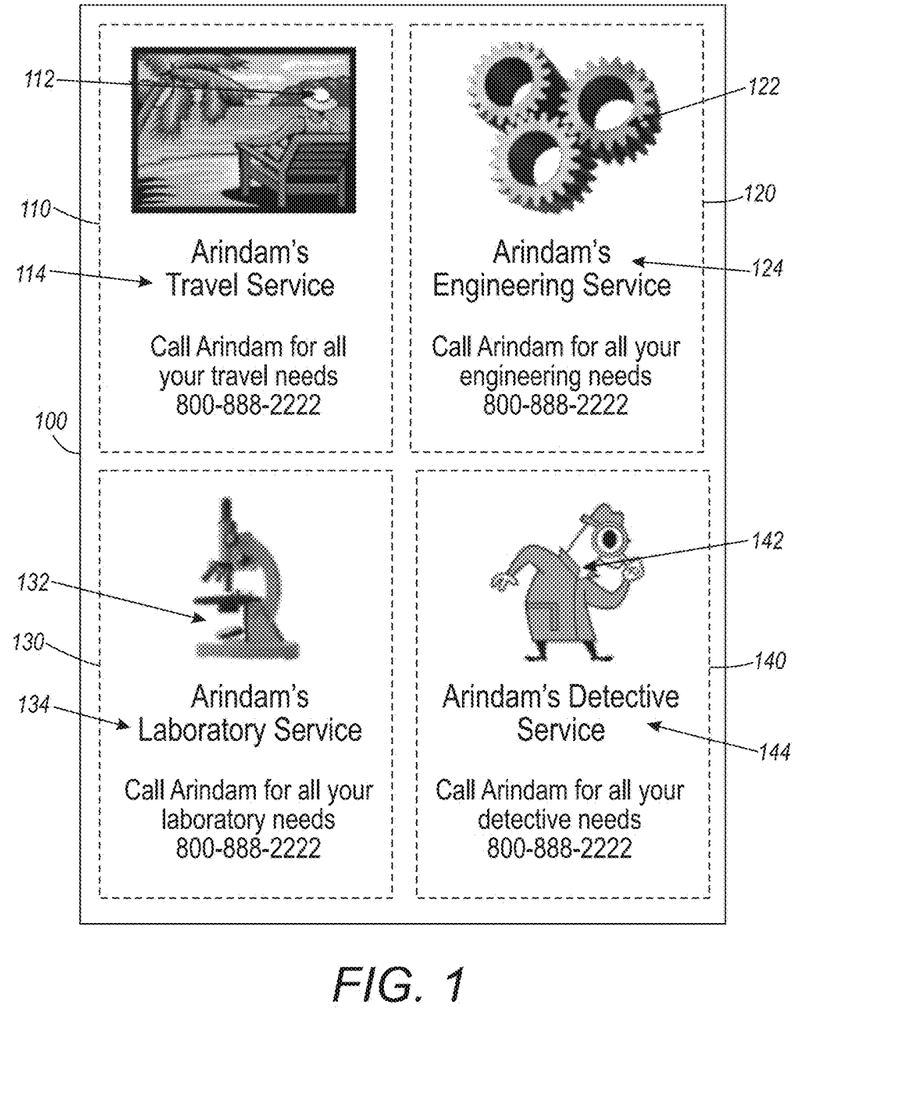
FIGS. 1 and 2A-2D are schematic diagrams illustrating printing performed by devices herein.

FIG. 1 illustrates an example where four logical pages 110, 120, 130, 140 are arranged to be printed on one physical sheet 100 of print media. Note that the dashed lines in FIG. 1 are used to identify each logical page, and would not appear on the printed sheet. Also, while FIG. 1 only illustrates a single physical sheet 100, those ordinarily skilled in the art would understand that print jobs can include a single sheet, or could call for printing multiple physical sheets, some or all of which could contain multiple logical pages. Therefore, the printing shown in FIG. 1 is intended to illustrate both single-sheet print jobs and multi-sheet print jobs, as well as simplex (one-sided) and duplex (two-sided) printing, etc.

As can be seen in FIG. 1, logical page 110 includes white markings 112 in an image, and other markings 114, such as graphics and text. Similarly, logical page 120 includes white markings 122 in an image, and other markings 124; logical page 130 includes white markings 132 in an image, and other markings 134; logical page 140 includes white markings 142 in an image, and other markings 144.

In this example, the print job calls for printing the white markings 112, 122, 132, 142 using a white spot color to provide emphasis in each of the images. Further, the print job defines that the first logical page 110 uses only a single printing pass of the white spot color for item 112. However, the print job calls for printing the second logical page 120 using two passes of the white spot color for item 122, printing the third logical page 130 using three passes of the white spot color for item 132, and printing the fourth logical page 140 using five passes of the white spot color for item 132.

Figure 2A:
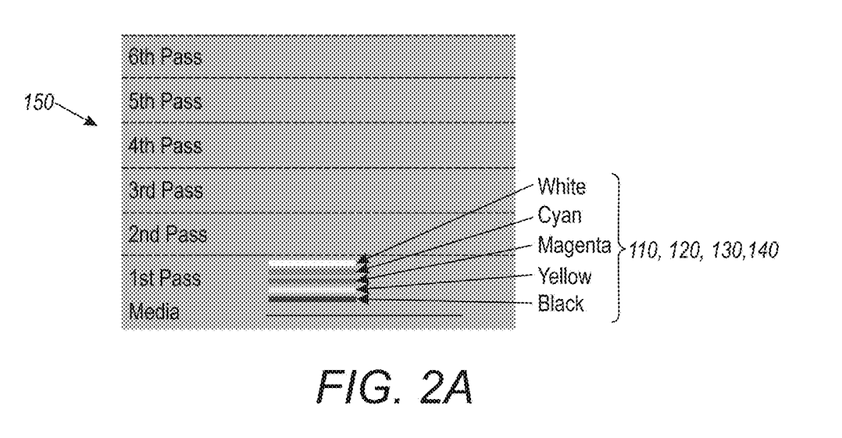
Figure 2B:
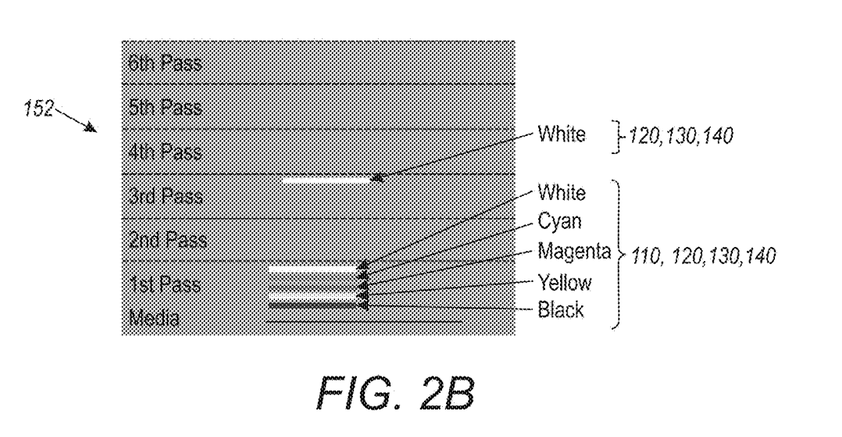
Figure 2C:
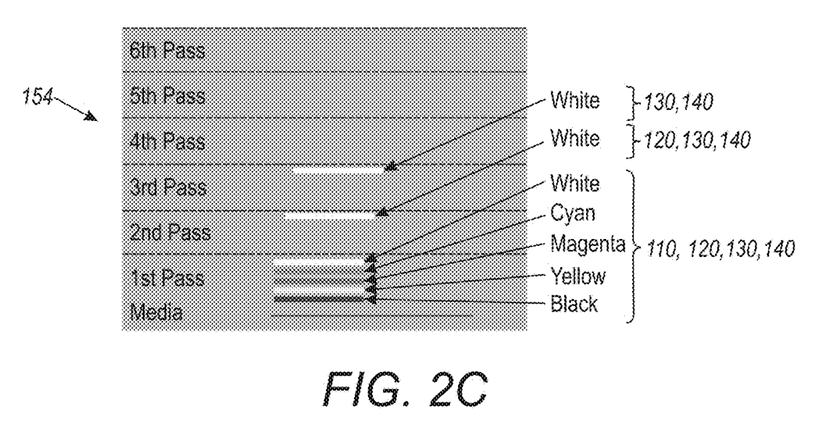
Figure 2D:
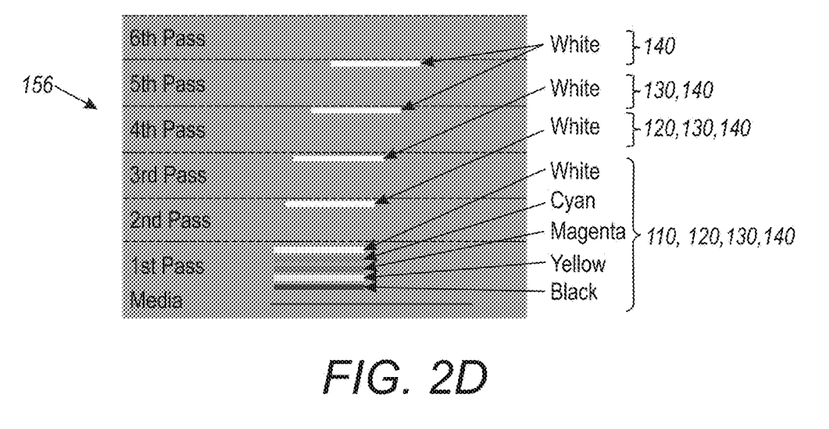

FIGS. 2A-2D show such a printing arrangement in printing pass layers, where item 150 in FIG. 2A shows the first printing pass in which the base colorants (cyan, magenta, yellow, black (CMYK)) and the white spot color are printed on all the logical pages 110, 120, 130, 140 simultaneously in a single (first) printing pass. Similarly, item 152 in FIG. 2B shows the first and second printing passes, where the base colorants (CMYK) are not printed in the second printing pass, and only the white spot color is printed only on the other three logical pages 120, 130, 140 simultaneously in a single printing pass (the second printing pass) and not on the first logical page 110. Continuing with the same print job example, item 154 in FIG. 2C shows the first-third printing passes, where the base colorants (CMYK) are again not printed in the third printing pass, and only the white spot color is printed only on two of the logical pages 130, 140 simultaneously in a single printing pass (the third printing pass) and not on the first or second logical pages 110, 120. FIG. 2D shows the first-fifth printing passes, where the base colorants (CMYK) are again not printed in the fourth and fifth printing passes, and only the white spot color is printed only on logical page 140, and not on the first-third logical pages 110, 120, 130.

FIGS. 2A-2D conceptually illustrates the modified bitmaps that are automatically created (without requiring any additional user input or action) by the systems and methods herein. More specifically, the first bitmap (conceptually shown in FIG. 2A) is the standard output the raster image processor produces to print the first pass. The systems and methods herein store the first bitmap in a buffer.

When creating the next bitmap for the second printing pass, the systems and methods herein simply remove all color plans other than the white spot color plane from the buffer (without creating a new bitmap); and remove all pixels that are associated with the first logical page 110 from the buffer, to produce a modified or reduced bitmap that is used in the second printing pass (conceptually shown in FIG. 2B). Again, the systems and methods herein store the modified bitmap in the buffer.

Similar processing continues to remove pixels that are associated with the second logical page from the extension colorant plane that is stored in the buffer to create an additionally modified (third) bitmap for printing the third printing pass (conceptually shown in FIG. 2C). Once again, the systems and methods herein store the third bitmap in the buffer. Finally, pixels associated with the third logical page are removed from the third bitmap in the buffer to create the fourth bitmap that is used for the fourth and fifth printing passes (conceptually shown as FIG. 2D).

Therefore, as shown above, processing herein begins with the full bitmap that prints with base and extension colorants on all logical pages, and stores that original bitmap in a buffer. Next, this processing successively removes one or more color planes (and potentially pixels associated with one or more logical pages) from successive buffers to create the additional unique bitmaps for each subsequent printing pass (or set of printing passes).

Note that while all the base color planes are removed to create the modified bitmap in the foregoing example, one or more of the base colorant planes (without pixel modification) can be included in the second and following bitmaps, if that the print job calls for multiple printing passes of some of the base colorants. Therefore, in a different example, repeated printing passes using the base color yellow could be included, for example, in the second and third printing passes that are discussed above. Those ordinarily skilled in the art would understand that while the foregoing example describes that only the white spot color is used in subsequent printing passes, base colorant planes (without modification) could also be used in subsequent printing passes, and could similarly be limited to specific logical pages, using the processing described above.

Figure 3:
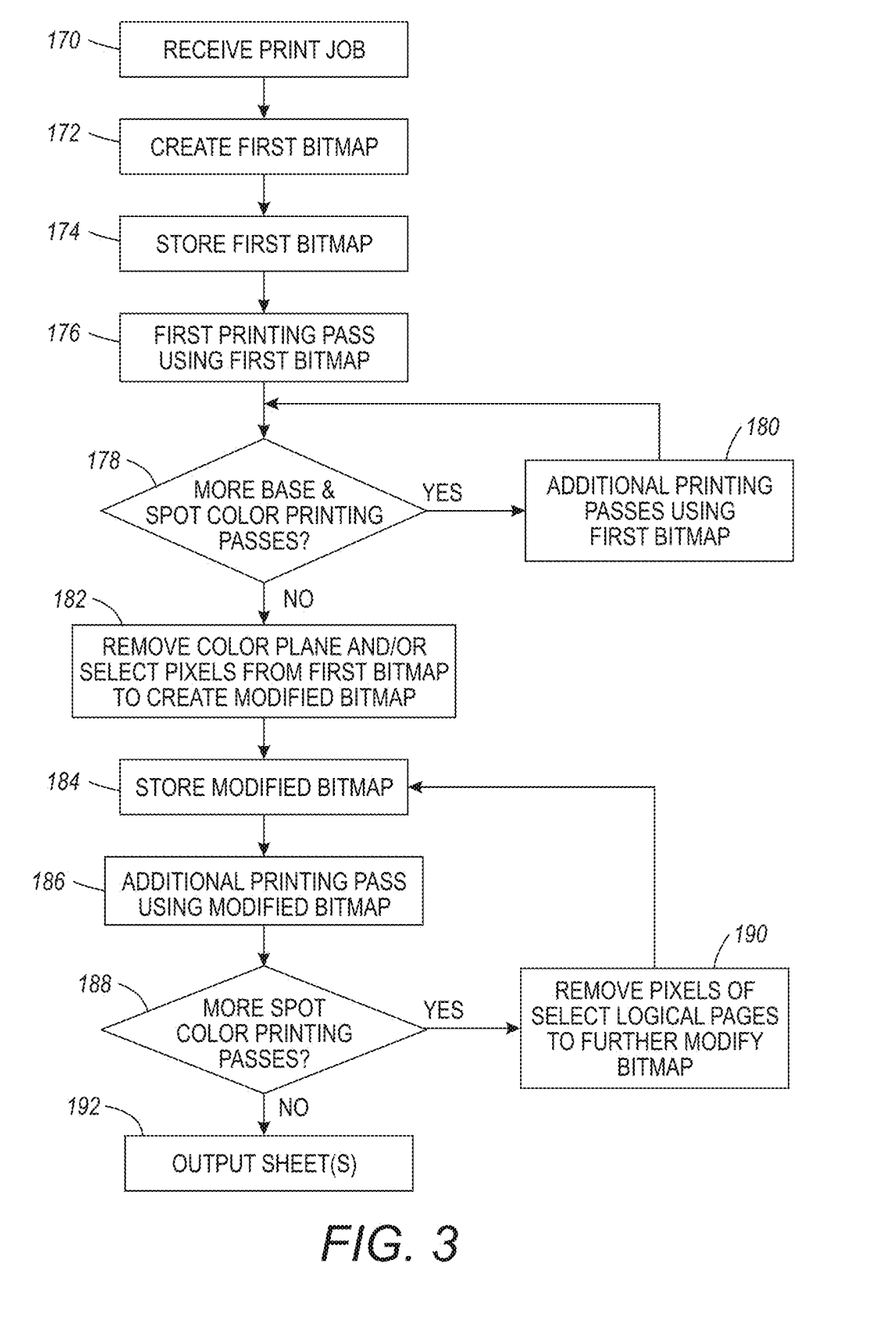
FIG. 3 is a flow diagram of various methods herein.

FIG. 3 is flowchart illustrating exemplary methods herein. In item 170, these methods receive print jobs. Such print jobs can include instructions to print multiple logical pages of the print job on a given sheet (e.g., print multiple logical pages of the print job, potentially on a single sheet of print media). In such processing, the printing can simultaneously print different logical pages of the print job on different regions of a given sheet of print media (e.g., N-up printing)

to avoid overlap of the logical pages on the sheet. In one example, the print job can include instructions to print at least two of the multiple logical pages on each side of each sheet of print media.

Also, these print jobs can call for printing these multiple logical pages using base colorants and an extension colorant. The extension colorant comprises user-changeable color, and the base colorants comprise non-changeable colors used to print all print jobs. The extension colorant uses a more expensive marking material relative to the base colorants, and is therefore generally used sparingly.

Further, the print jobs can direct that the printing of the extension colorant be performed in multiple printing passes. In such situations, print jobs can be processed by methods herein to perform a different number of printing passes of the extension colorant, even for different logical pages that are printed on the same sheet.

More specifically, in item 172 these methods create (using a processor of the printer) a first bitmap of the base colorants and the extension colorant for the multiple logical pages being simultaneously printed on a given sheet. The first bitmap is stored in a buffer in item 174, and then, in item 176, these methods use a marking engine of the printing device to perform a first printing pass by printing first markings of the base colorants and the extension colorant on a sheet according to the first bitmap.

Before multiple printing passes of just the extension marking material (discussed below) occur, intermediate markings of both the base colorants and the extension colorant can be printed on the same sheet to perform at least one intermediate printing pass after the first printing pass, and before the "second" printing pass discussed below. Therefore, in item 178, these methods check to see whether the print job contains instructions to perform additional passes of the first bitmap; and, if so, in item 180, sheet feeding equipment of the printing device is used to return the single sheet to the marking engine after the first printing pass for additional markings to be printed on the markings printed in the first printing pass. The additional markings in these additional intermediate printing passes performed in item 180 can be the entire first bitmap reprinted directly on a previous printing of the first bitmap, or a different (newly created) bitmap if different pixels than the first bitmap are to be printed in the next printing pass. However, if a different bitmap is to be used in subsequent printing passes, a new bitmap is created by the raster image processor, which consumes additional resources and slows machine processing.

Once the print job has finished calling for additional base and spot color printing passes in item 178, processing moves to item 182, where these methods initially alter or modify (using the processor) the first bitmap by removing printing of some or all of the base colorant planes and/or leaving only the pixels of the logical pages that contain an instruction to perform an additional printing pass of the extension colorant, and this processing creates a modified (e.g., second) bitmap. This processing is different than that performed in item 180, because the processing in item 182 does not create a new bitmap (as the processing in item 180 does), but instead only modifies the first bitmap by removing some or all of the base color planes, and potentially marking pixels of one or more of the logical pages in the extension colorant plane as non-printing. Thus, such processing in item 182 does not call on the raster image processor to create a new bitmap as the processing in item 180 does; thereby avoiding using raster image processor resources to produce the modified bitmap, and improving machine operation. This allows the processing in item 182 to be much more efficient with computing resources when compared to the processing in item 180, and improves machine operation, because in the processing in item 182, the raster image processor does not need to make a new bitmap.

For example, the first bitmap comprises pixels in different color planes that determine printing, or non-printing, locations on the sheets for the marking devices. In one example, the processing in item 182 may remove all items except an extension colorant plane from the first bitmap, to create the modified bitmap that contains only the extension colorant plane.

When modifying the bitmap to remove pixels of logical pages that will not receive additional printing passes in item 182, such methods use the processor to create identifiers for the multiple logical pages that will be printed on a given sheet, and associate one of these identifiers with each of the pixels in the first bitmap so that the processor can identify to which logical page each pixel in the first bitmap corresponds. This allows pixels of one logical page in the extension colorant plane to be marked as non-printing, without affecting the pixels of other logical pages in the extension colorant plane.

In item 184, the modified bitmap is stored in the same, or different, buffer. Then in item 186, an additional (e.g., second) printing pass is performed by the marking engine, to print second markings of only the modified bitmap on the same sheet on top of the previously printing. Item 188 then checks to see whether the print job calls for more printing passes using the spot colors; and, if not, the sheet is output in item 192;

However, if the print job calls for more printing passes using the spot colors, with the methods herein, the processor additionally modifies the modified bitmap by removing printing of the extension colorant for ones of the logical pages that do not contain an instruction to perform an additional printing pass of the extension colorant, and this creates a further modified further modified bitmap in item 190.

From item 190, processing returns to item 184, where this further modified bitmap is stored, and in item 186, again, the sheet feeding equipment is used by methods herein to return the single sheet to the marking engine. This allows an additional print pass to be performed by the marking engine in item 186, which prints additional markings of only the extension colorant on the same sheet according to the additionally modified bitmap. These processes of additionally modifying the bitmap in item 190, storing the bitmap in item 184, and performing additional printing passes in item 186 are repeated for ones of the logical pages that contain an instruction to perform an additional printing pass of the extension colorant, until no more of the logical pages contain the instruction to perform an additional printing pass of the extension colorant in item 188. Again, in item 192, the sheet feeding equipment outputs the sheet after the repeated processing in items 184-190 is completed.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to calculate bitmaps, alter bitmaps by removing color planes, account for different pixels in such bitmaps according to logical pages contained therein, etc., as performed by the methods and devices discussed herein, the manual process would be sufficiently inaccurate and take an excessive amount of time to render the manual results useless.

Specifically, processes such as receiving electronic data streams, updating stored data, using the methods to automatically calculate bitmaps and perform printing, etc., requires the utilization of different specialized machines, and humans performing such processing would not produce useful results because of the time lag, inconsistency, and inaccuracy humans would introduce into the results. Specifically, processes such as, electronic transmission of data over networks, creating bitmaps, altering bitmaps, controlling printheads using electronic data within bitmaps, etc., requires the utilization of different specialized machines. Therefore, for example, the data modification performed by the user device cannot be performed manually (because it would take decades or lifetimes) and is integral with the processes performed by methods herein. Thus, processes such as processing image data pixel-by-pixel, electronically storing bitmaps as 1's and 0's, etc., requires the utilization of different specialized machines, and humans cannot perform such processing.

Further, such machine-only processes are not mere "post-solution activity" because the methods utilize machines at each step, and cannot be performed without machines. Thus, the receipt of an electronic data stream print job, calculating bitmaps, altering bitmaps, etc., are steps that are integral with the process performed by the methods herein, and are not mere post-solution activity, because the methods herein rely upon the previous data processing step, and cannot be performed without such electronic processing. In other words, these various machines are integral with the methods herein because the methods cannot be performed without the machines (and cannot be performed by humans alone).

Additionally, the methods herein solve many highly complex technological problems. For example, processing devices that perform multiple printing passes using spot colors during N-up printing do not distinguish between different logical pages on a given printed sheet. Methods herein solve this technological problem by buffering the previous bitmap, altering that bitmap by removing at least some of the printing without using processing resources to create a new bitmap, and repeating printing with the altered bitmap. This processing avoids having the raster image processor recalculate a new bitmap each time, because the previous bitmap is merely altered by the removal of some printing information (such as color planes and/or pixels of specific logical pages). In doing so, the methods and systems reduce the processing performed by the raster image processor, which allows processing resources to be focused on smaller number of pixels, and causes other raster processing to be performed faster because raster image processor resources have been freed-up, etc., thereby improving the operation of the machine.

Also, by reducing the usage of the raster image processor, this reduces the amount of time that the raster image processor is on (thereby saving power) and also reduces the load on all processing components, which in turn reduces the amount and complexity of hardware and software needed to be purchased, installed, and maintained, thereby solving a substantial technological problem that is experienced today.

Figure 4:
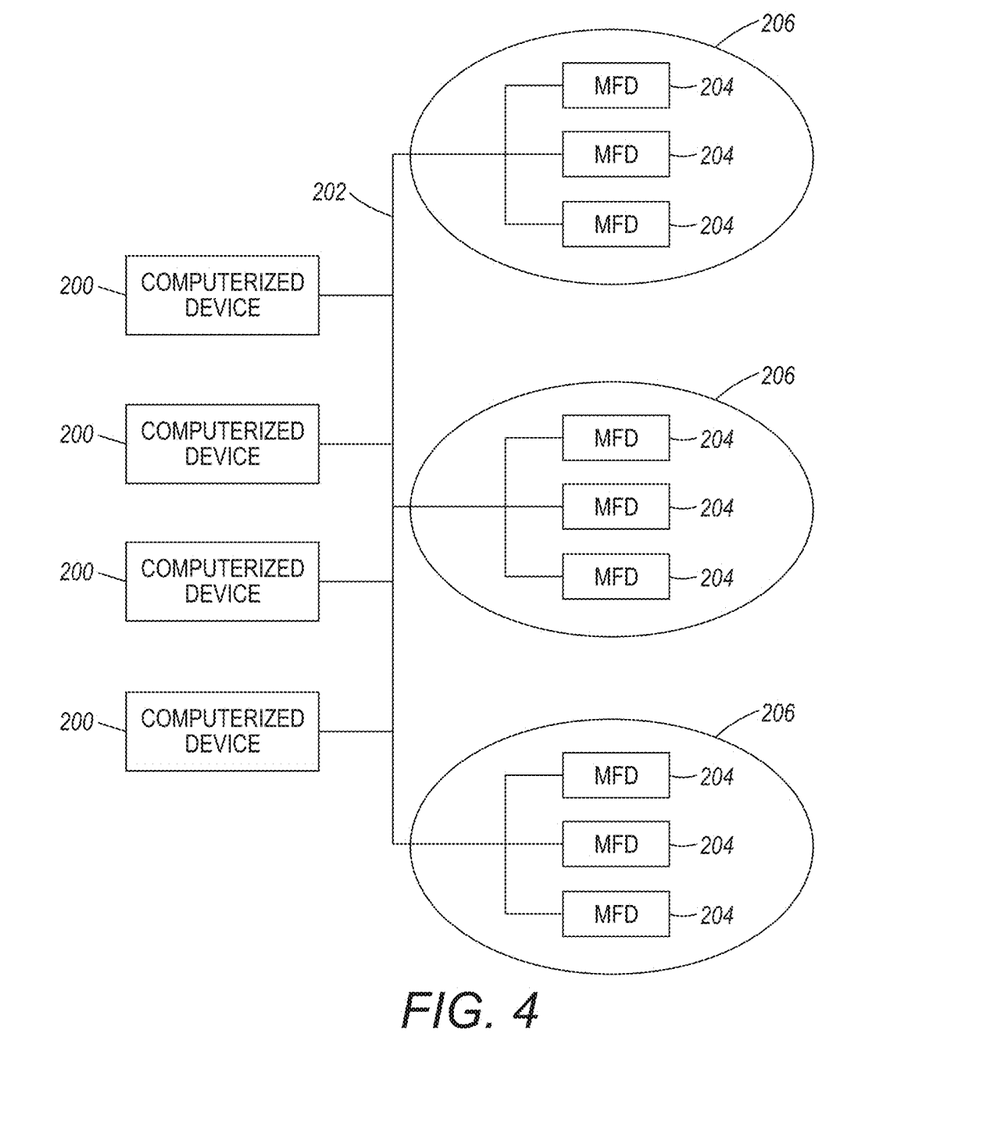
FIG. 4 is a schematic diagram illustrating systems herein.

As shown in FIG. 4, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202. The processing discussed above can be performed locally at a single printer 204, or remotely by processing using remote computerized devices 200 in communications performed over the computerized network 202.

Figure 5:
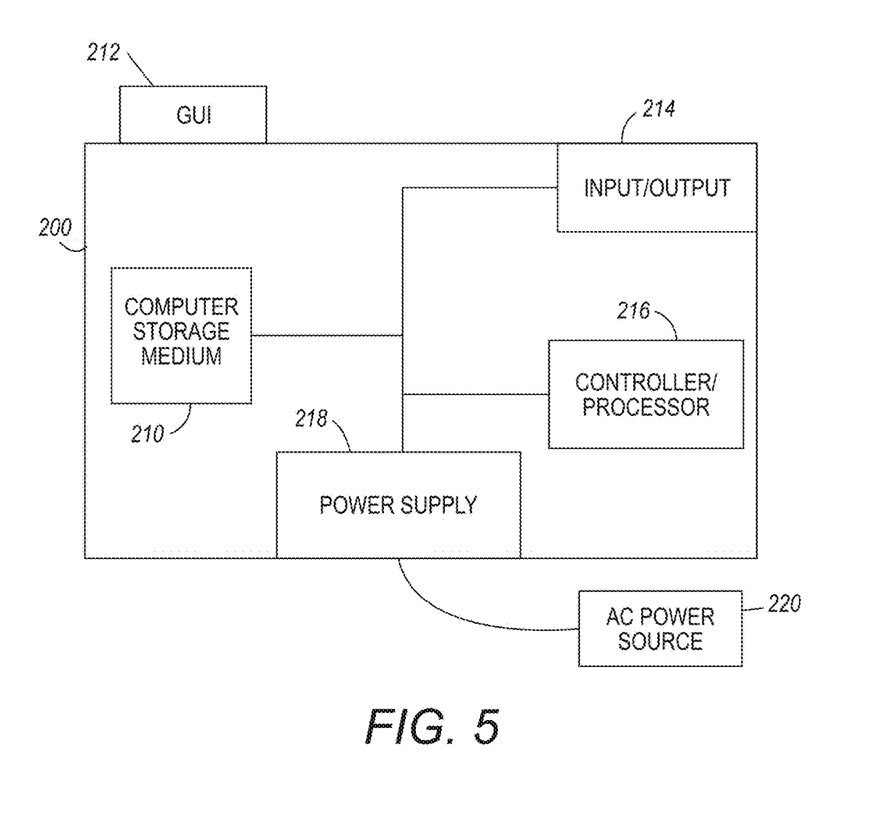
FIGS. 5 and 6 are schematic diagrams illustrating devices herein.

FIG. 5 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 5, a body housing has one or more functional components that operate on power supplied from an alternating current (AC) source 220 by the power supply 218. The power supply 218 can comprise a common power conversion unit, power storage element (e.g., a battery, etc), etc.

Figure 6:
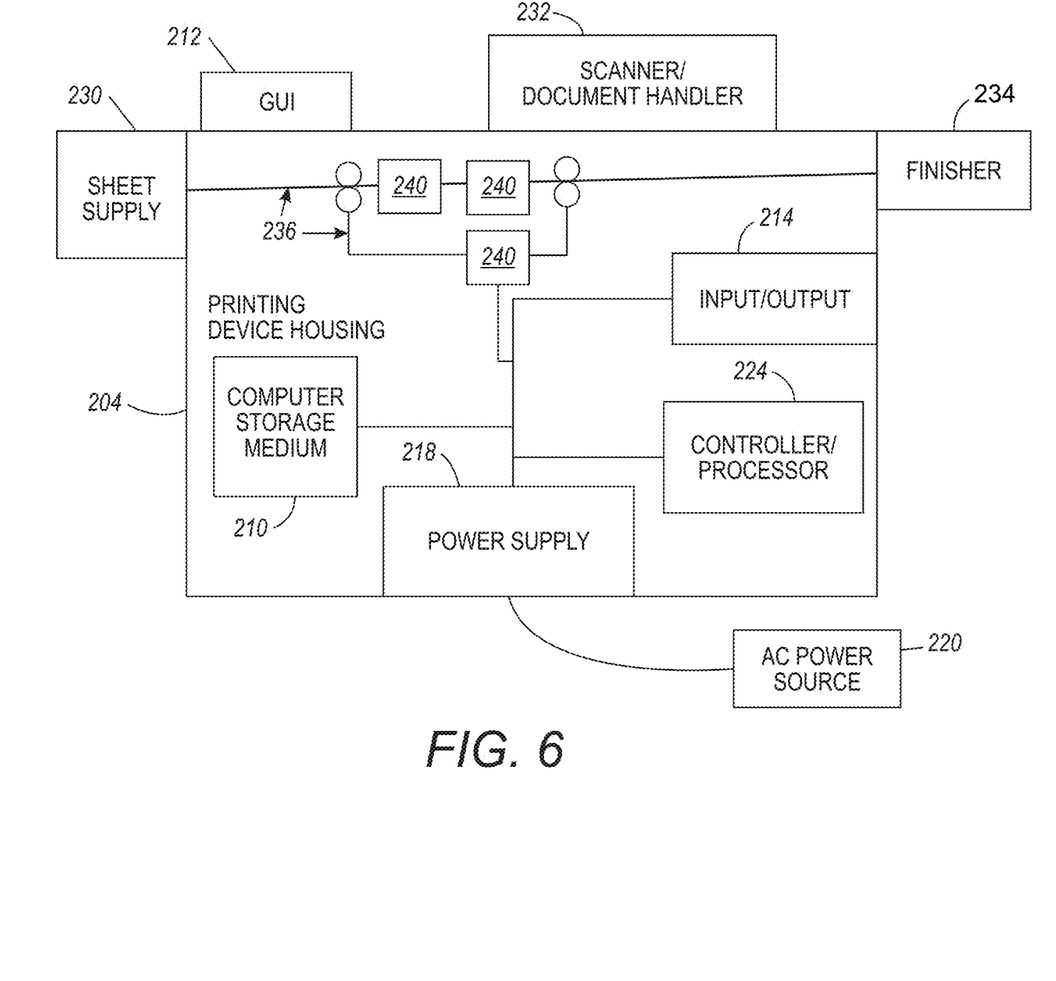

FIG. 6 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general-purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt or devices that print directly to print media (e.g., inkjet printers, ribbon-based contact printers, etc.).

Therefore, as shown above, various printing device perform such methods, and generally include (among other components) a processor 224, a marking engine 240 electrically connected to the processor 224, sheet feeding equipment 236 electrically connected to the processor 224, etc. The processor 224 is capable of receiving a print job from a computerized device 200 through the computer network 202, that calls for printing multiple logical pages on some or every sheet of print media (e.g., performed by simultaneously printing the multiple logical pages on different regions of the single sheet of print media). Again, such a print job can call for printing of the extension colorant in multiple printing passes, but where a different number of printing passes of the extension colorant are used for different ones of the multiple logical pages.

The processor 224 is capable of creating a first bitmap of the base colorants and the extension colorant for the multiple logical pages being simultaneously printed on the single sheet. The marking engine 240 is capable of initially printing first markings of the base colorants and the extension colorant on the single sheet according to the first bitmap to perform a first printing pass.

The sheet feeding equipment 236 is capable of returning the single sheet to the marking engine 240 after the first printing pass. The marking engine 240 is capable of printing intermediate markings of the base colorants and the extension colorant on the single sheet according to the first bitmap to perform at least one intermediate printing pass after the first printing pass, and before the second printing pass described below.

The processor 224 is capable of initially modifying the first bitmap by, for example, removing printing of the base colorants and leaving printing of only the extension colorant for ones of the multiple logical pages that contain an instruction to perform an additional printing pass of the extension colorant, to create a modified bitmap. Again, the processor 224 creates pixel identifiers for the multiple logical pages, and associates one of the identifiers with each of the pixels. In one example, the processor 224 initially modifies the first bitmap by selecting only an extension colorant plane from the first bitmap to create the modified bitmap.

The marking engine 240 is capable of secondarily printing second markings of only the extension colorant on the single sheet according to the modified bitmap to perform a second printing pass. The processor 224 is capable of additionally modifying the modified bitmap by removing printing of the extension colorant for ones of the multiple logical pages that do not contain an instruction to perform an additional printing pass of the extension colorant, to create a further modified bitmap.

The sheet feeding equipment 236 is capable of returning the single sheet to the marking engine 240 after the second printing pass. The marking engine 240 is capable of additionally printing additional markings of only the extension colorant on the single sheet according to the further modified bitmap to perform an additional printing pass.

The processor 224 and the marking engine 240 are capable of repeating the additionally modifying and the additionally printing for ones of the multiple logical pages that contain an instruction to perform an additional printing pass of the extension colorant, until no more of the multiple logical pages contain the instruction to perform an additional printing pass of the extension colorant. The sheet feeding equipment 236 is capable of outputting the single sheet after the repeating is completed.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
a processor; and
a marking engine electrically connected to said processor,
said processor is capable of receiving a print job,
said print job includes instructions to print multiple pages on a single sheet of print media using base colorants and an extension colorant, to perform printing in multiple printing passes, and to perform a different number of said printing passes of said extension colorant for different ones of said multiple pages,
said processor is capable of creating a first bitmap for said multiple pages,
said marking engine is capable of performing a first printing pass by printing markings on said single sheet according to said first bitmap,
said processor is capable of initially modifying said first bitmap to leave printing of only said extension colorant, to create a modified bitmap,
said marking engine is capable of performing a second printing pass by printing markings on said single sheet according to said modified bitmap,
said processor is capable of additionally modifying said modified bitmap by removing printing of said extension colorant for ones of said multiple pages that do not contain an instruction to perform an additional printing pass of said extension colorant, to create an further modified bitmap,
said marking engine is capable of performing at least one additional printing pass by printing markings on said single sheet according to said further modified bitmap, and
said processor and said marking engine are capable of repeating said additionally modifying and said additionally printing until no more of said multiple pages contain said instruction to perform an additional printing pass of said extension colorant.

2. The printing device according to claim 1, said first bitmap comprises pixels, said printing device further comprises:
creating, by said processor, identifiers for said multiple pages; and
associating, by said processor, one of said identifiers with each of said pixels.

3. The printing device according to claim 1, said processor initially modifies said first bitmap by selecting only an extension colorant plane from said first bitmap to create said modified bitmap.

4. The printing device according to claim 1, said marking engine is capable of printing intermediate markings of said base colorants and said extension colorant on said single sheet according to said first bitmap to perform at least one intermediate printing pass after said first printing pass, and before said second printing pass.

5. The printing device according to claim 1, said print job includes instructions to print at least two of said multiple pages on each side of said single sheet of print media.

6. The printing device according to claim 1, said extension colorant comprises user-changeable color, and said base colorants comprise non-changeable colors used to print all print jobs.

7. The printing device according to claim 1, said extension colorant uses a more expensive marking material relative to said base colorants.

8. A printing device comprising:
a processor;
a marking engine electrically connected to said processor; and
sheet feeding equipment electrically connected to said processor,
said processor is capable of receiving a print job,
said print job includes instructions:
to print multiple pages on a single sheet of print media by simultaneously printing said multiple pages on different regions of said single sheet of print media;
to print said multiple pages using base colorants and an extension colorant;
to perform printing of said extension colorant in multiple printing passes; and
to perform a different number of said printing passes of said extension colorant for different ones of said multiple pages,
said processor is capable of creating a first bitmap of said base colorants and said extension colorant for said multiple pages being simultaneously printed on said single sheet,
said marking engine is capable of performing a first printing pass by printing first markings of said base colorants and said extension colorant on said single sheet according to said first bitmap,
said processor is capable of initially modifying said first bitmap by removing printing of said base colorants and leaving printing of only said extension colorant for ones of said multiple pages that contain an instruction to perform an additional printing pass of said extension colorant, to create a modified bitmap,
said sheet feeding equipment is capable of returning said single sheet to said marking engine after said first printing pass,
said marking engine is capable of performing a second printing pass by printing second markings of only said extension colorant on said single sheet according to said modified bitmap, said processor is capable of additionally modifying said modified bitmap by removing printing of said extension colorant for ones of said multiple pages that do not contain an instruction to perform an additional printing pass of said extension colorant, to create a further modified bitmap, said sheet feeding equipment is capable of returning said single sheet to said marking engine after said second printing pass, said marking engine is capable of performing an additional printing pass by printing additional markings of only said extension colorant on said single sheet according to said further modified bitmap, said processor and said marking engine are capable of repeating said additionally modifying and said additional printing pass for ones of said multiple pages that contain an instruction to perform an additional printing pass of said extension colorant, until no more of said multiple pages contain said instruction to perform an additional printing pass of said extension colorant, and said sheet feeding equipment is capable of outputting said single sheet after said repeating is completed.

9. The printing device according to claim 8, said first bitmap comprises pixels, said printing device further comprises:

creating, by said processor, identifiers for said multiple pages; and associating, by said processor, one of said identifiers with each of said pixels.

10. The printing device according to claim 8, said processor initially modifies said first bitmap by selecting only an extension colorant plane from said first bitmap to create said modified bitmap.

11. The printing device according to claim 8, said marking engine is capable of printing intermediate markings of said base colorants and said extension colorant on said single sheet according to said first bitmap to perform at least one intermediate printing pass after said first printing pass, and before said second printing pass.

12. The printing device according to claim 8, said print job includes instructions to print at least two of said multiple pages on each side of said single sheet of print media.

13. The printing device according to claim 8, said extension colorant comprises user-changeable color, and said base colorants comprise non-changeable colors used to print all print jobs.

14. The printing device according to claim 8, said extension colorant uses a more expensive marking material relative to said base colorants.

15. A method comprising:

receiving a print job into a processor of a printing device, said print job includes instructions to print multiple pages on a single sheet of print media by simultaneously printing said multiple pages on different regions of said single sheet of print media, to print said multiple pages using base colorants and an extension colorant, to perform printing of said extension colorant in multiple printing passes, and to perform a different number of said printing passes of said extension colorant for different ones of said multiple pages;

creating, by said processor, a first bitmap of said base colorants and said extension colorant for said multiple pages being simultaneously printed on said single sheet;

perform a first printing pass, by a marking engine of said printing device, by printing first markings of said base colorants and said extension colorant on said single sheet according to said first bitmap;

initially modifying, by said processor, said first bitmap by removing printing of said base colorants and leaving printing of only said extension colorant for ones of said multiple pages that contain an instruction to perform an additional printing pass of said extension colorant, to create a modified bitmap;

returning, by sheet feeding equipment of said printing device, said single sheet to said marking engine after said first printing pass;

perform a second printing pass, by said marking engine, by printing second markings of only said extension colorant on said single sheet according to said modified bitmap;

additionally modifying, by said processor, said modified bitmap by removing printing of said extension colorant for ones of said multiple pages that do not contain an instruction to perform an additional printing pass of said extension colorant, to create a further modified bitmap;

returning, by said sheet feeding equipment, said single sheet to said marking engine after said second printing pass;

performing an additional printing pass, by said marking engine, by printing additional markings of only said extension colorant on said single sheet according to said further modified bitmap;

repeating said additionally modifying and said additionally printing pass for ones of said multiple pages that contain an instruction to perform an additional printing pass of said extension colorant, until no more of said multiple pages contain said instruction to perform an additional printing pass of said extension colorant; and outputting, using said sheet feeding equipment, said single sheet after said repeating is completed.

16. The method according to claim 15, said first bitmap comprises pixels, said method further comprises:

creating, by said processor, identifiers for said multiple pages; and associating, by said processor, one of said identifiers with each of said pixels.

17. The method according to claim 15, said initially modifying of said first bitmap comprises selecting only an extension colorant plane from said first bitmap to create said modified bitmap.

18. The method according to claim 15, further comprising printing, by said marking engine, intermediate markings of said base colorants and said extension colorant on said single sheet according to said first bitmap to perform at least one intermediate printing pass after said first printing pass, and before said second printing pass.

19. The method according to claim 15, said print job includes instructions to print at least two of said multiple pages on each side of said single sheet of print media.

20. The method according to claim 15, said extension colorant comprises user-changeable color, and said base colorants comprise non-changeable colors used to print all print jobs.

\* \* \* \* \*